(12) United States Patent
Jansson et al.

(10) Patent No.: US 9,435,215 B2
(45) Date of Patent: Sep. 6, 2016

(54) GAS TURBINE STRUCTURE

(75) Inventors: Niklas Jansson, Mölndal (SE); Robert Reimers, Uddevalla (SE)

(73) Assignee: GKN Aerospace Sweden AB, Trollhattan (SE)

( * ) Notice: Subject to any disclaimer, the term of this patent is extended or adjusted under 35 U.S.C. 154(b) by 476 days.

(21) Appl. No.: 14/005,146

(22) PCT Filed: Mar. 14, 2011

(86) PCT No.: PCT/SE2011/000049
§ 371 (c)(1),
(2), (4) Date: Nov. 15, 2013

(87) PCT Pub. No.: WO2012/125084
PCT Pub. Date: Sep. 20, 2012

(65) Prior Publication Data
US 2014/0161605 A1    Jun. 12, 2014

(51) Int. Cl.
*F01D 9/04* (2006.01)
*F01D 25/24* (2006.01)
*F01D 25/28* (2006.01)

(52) U.S. Cl.
CPC .................. *F01D 9/041* (2013.01); *F01D 9/04* (2013.01); *F01D 25/246* (2013.01); *F01D 25/28* (2013.01); *F05B 2260/301* (2013.01); *Y02T 50/672* (2013.01)

(58) Field of Classification Search
CPC .......... F01D 9/04; F01D 9/041; F01D 9/042; F01D 1/04; F01D 25/28; F01D 25/246
See application file for complete search history.

(56) References Cited

U.S. PATENT DOCUMENTS 5,320,490 A    6/1994    Corbin et al.
5,399,069 A    3/1995    Marey et al.

FOREIGN PATENT DOCUMENTS

EP    0219445 B1    4/1987

OTHER PUBLICATIONS

International Search Report (Nov. 17, 2011) for corresponding International App. PCT/SE2011/000049.

*Primary Examiner* — Craig Kim
*Assistant Examiner* — Maxime Adjagbe
(74) *Attorney, Agent, or Firm* — Bejin Bieneman PLC

(57) ABSTRACT

A gas turbine structure includes a guide vane. The gas turbine structure (further includes a first housing and a second housing and the guide vane extends from the first housing to the second housing. The guide vane includes a leading edge and a trailing edge and the guide vane extends from the leading edge to the trailing edge along a mean camber line. The guide vane includes a first attachment structure, a first fastening arrangement and a second fastening arrangement. Moreover, the first attachment structure includes a stiffening member extending over at least a portion of a circumference of the first housing. Furthermore, the stiffening member includes a stiffening member center point as measured along the mean camber line.

16 Claims, 6 Drawing Sheets

GAS TURBINE STRUCTURE

BACKGROUND AND SUMMARY

The present disclosure relates to a gas turbine structure. Moreover, the present disclosure relates to a gas turbine engine. Furthermore, the present disclosure relates to an aeroplane.

A gas turbine engine may be used as a jet engine. The term jet engine includes various types of engines, which admit air at relatively low velocity, heat it by combustion and shoot it out at a much higher velocity.

Accommodated within the term jet engine are, for example, turbojet engines and turbo-fan engines. The invention will below be described for a turbo-fan engine, but may of course also be used for other engine types.

A gas turbine structure, which may sometimes be denoted a case or frame, is used for supporting and carrying bearings, which in turn, rotatably support rotors. Conventional turbo fan engines have a fan frame, a mid-frame and an aft turbine frame. These frames constitute a gas turbine structure including a first housing, a second housing and a strut or a vane having a first end of the strut or vane being attached to the first housing and a second end being attached to the second housing. A vane or strut may be made of a composite material.

In order to achieve the attachment of the strut or vane to the first housing and second housing, respectively, U.S. Pat. No. 5,320,490 proposes the use of linking braces each one of which connecting a corner of the strut or vane to the first or second housing. However, the '490 solution does not necessarily provide an appropriate load distribution between the first and second housings via the strut or vane. Moreover, the '490 solution may result in large loads on bolts connecting the linking braces to the first housing or second housing.

It is desirable to provide a gas turbine structure which overcomes or ameliorates at least one of the disadvantages of the prior art, or to provide a useful alternative.

As such, the present disclosure relates to a gas turbine structure comprising a guide vane. The gas turbine structure further comprises a first housing and a second housing and the guide vane extends from the first housing to the second housing. Moreover, the guide vane comprises a leading edge and a trailing edge and the guide vane extends from the leading edge to the trailing edge along a mean camber line.

As used herein, the expression "mean camber line" is intended to mean the locus of points halfway between a suction side and a pressure side of the guide vane as measured perpendicular to the mean camber line itself.

The guide vane comprises a first attachment structure, a first fastening means, or a first fastener, and a second fastening means, or a second fastener. The first attachment structure comprises a stiffening member extending over at least a portion of a circumference of the first housing. Moreover, the stiffening member comprises a stiffening member centre point as measured along the mean camber line.

The first housing generally extends in a longitudinal direction which is parallel to a longitudinal axis as well as in a circumferential direction extending around the longitudinal axis. Moreover, the first housing generally has a first housing thickness in a radial direction. As used herein, the expression "stiffening member" refers to a member which provides stiffness in at least the radial direction. The stiffening member as discussed hereinabove preferably has a stiffening member width, i.e. an extension in a direction substantially parallel to the longitudinal direction, a stiffening member height, i.e. an extension in a direction substantially parallel to the radial direction, and a stiffening member length, i.e. an extension in a direction substantially parallel to the circumferential direction.

In order to provide an appropriate stiffness, at least in a direction parallel to the radial direction of the first housing, the stiffening member preferably has a stiffening member height which is at least 2 times, preferably at least 3 times, greater than the stiffening member width. Moreover, the stiffening member preferably has a stiffening member length which is at least 3 times, preferably at least 5 times, greater than the stiffening member width.

The first attachment structure is adapted to be releasably attached to the guide vane by the first and second fastening means such that the first fastening means is located at a first fastening position along the mean camber line and the second fastening means is located at a second fastening position along the mean camber line. Moreover, the attachment structure is attached to the first housing. The attachment structure may be releasably or fixedly attached to the first housing.

Generally, each one of the first fastening means and the second fastening means comprises an extension in a direction perpendicular to the mean camber line and the fastening means comprises a fastening means centre line in the direction perpendicular to the mean camber line. As used herein the expression "fastening position" relates to the position where the fastening means centre line, or an extension thereof, intersects the mean camber line.

According to the present disclosure, the first and second fastening positions are located on separate sides of the stiffening member centre point along the mean camber line.

During use, the guide vane may be subjected to loads such as drag loads from a fluid which is adapted to flow in the gas turbine structure and/or impact loads from ice particles or other types of particles which may enter the gas turbine structure during operation of the gas turbine of which the gas turbine structure forms a part. The above loads result in that attachment structures attaching the guide vane to the first housing and or second housing may be subjected to loads in the radial direction.

In order to transfer at least the radial load component imparted on the guide vane to the first housing in an appropriate manner, the attachment arrangement which attaches the guide vane to the first housing preferable has an appropriately high stiffness in at least the radial direction. It has been realized that a first attachment structure comprising a stiffening member according to the above may provide an appropriate stiffness in the radial direction. Moreover, the fact that the first and second fastening positions are located on separate sides of the stiffening member centre point along the mean camber line implies that an appropriate load distribution may be obtained from the guide vane to the first housing via the first attachment structure.

According to the present disclosure, the first fastening position, when measured along the mean camber line, may be located at a first distance from the stiffening member centre point and the second fastening position may be located at a second distance from the stiffening member centre point. The larger of the first and second distances may be less than 2 times, preferably less than 1.5 times, the smaller of the first and second distances.

According to the present disclosure, the attachment structure may be attached to a flange of the first housing.

According to the present disclosure, the first attachment structure may be adapted to be attached to the flange by means of at least a third fastening means. Moreover, the guide vane may extend in a guide vane direction from the first housing to the second housing and the third fastening means may extend in a third fastening direction which forms an angle with the guide vane direction.

According to the present disclosure, the first housing may extend in a longitudinal direction parallel to a longitudinal axis. Moreover, the first housing may extend in a circumferential direction around the longitudinal axis. The third fastening direction may be substantially parallel to the longitudinal direction.

According to the present disclosure, the first attachment structure may be fixedly attached to the first housing. Thus, the stiffening member may be fixedly attached to the first housing which in turn implies that the stiffening member may provide a large stiffness, at least in the radial direction.

A second aspect of the present invention relates to a gas turbine engine comprising a gas turbine structure according to the first aspect of the present invention.

A third aspect of the present invention relates to an aeroplane comprising a gas turbine engine according to the second aspect of the present invention.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION

Figure 1:
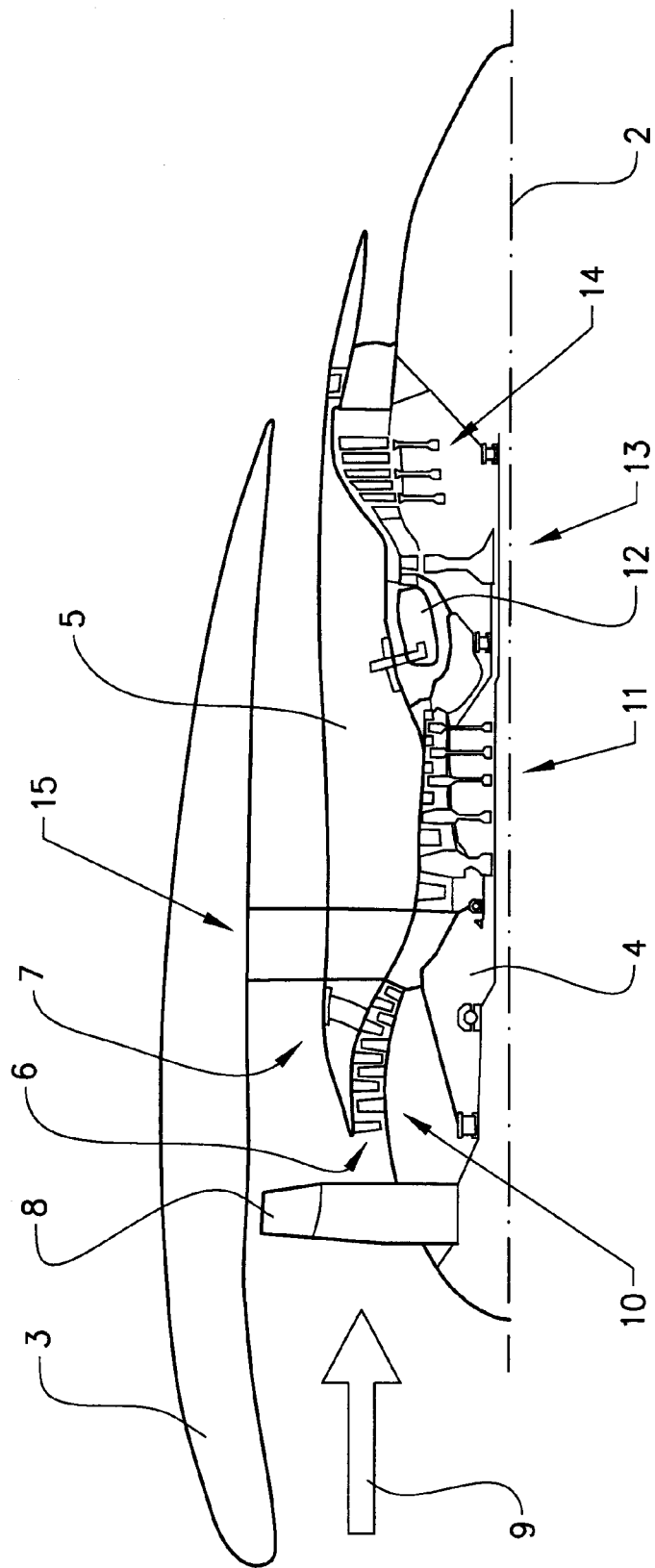
FIG. 1 illustrates a gas turbine engine.

The invention will below be described for a turbofan gas turbine aircraft engine 1, which in FIG. 1 is circumscribed about an engine longitudinal central axis 2. The engine 1 comprises an outer casing or nacelle 3, an inner casing 4 (rotor) and an intermediate casing 5 which is concentric to the first two casings and divides the gap between them into an inner primary gas channel or duct 6 for the compression of air and a secondary channel or fan duct 7 in which the engine bypass air flows. Thus, each of the gas channels 6, 7 is annular in a cross section perpendicular to the engine longitudinal central axis 2.

The engine 1 comprises a fan 8 which receives ambient air 9, a booster or low pressure compressor (LPC) 10 and a high pressure compressor (HPC) 11 arranged in the primary gas channel 6, a combustor 12 which mixes fuel with the air pressurized by the high pressure compressor 11 for generating combustion gases which flow downstream through a high pressure turbine (HPT) 13 and a low pressure turbine (LPT) 14 from which the combustion gases are discharged from the engine.

A first or high pressure shaft joins the high pressure turbine 13 to the high pressure compressor 11 to substantially form a first or high pressure rotor. A second or low pressure shaft joins the low pressure turbine 14 to the low pressure compressor 10 to substantially form a second or low pressure rotor. The high pressure compressor 11, combustor 12 and high pressure turbine 13 are collectively referred to as a core engine. The second or low pressure shaft is at least in part rotatably disposed co-axially with and radially inwardly of the first or high pressure rotor.

The engine 1 comprises an intermediate case (IMC), or gas turbine structure 15. The intermediate case 15 is located between the Low Pressure Compressor 10 and the High Pressure Compressor 11 in the engine axial direction. The intermediate case 15 comprises a core structure, which comprises the primary gas duct 6, and a by-pass structure, which comprises the fan duct 7. The engine 1 is mounted to an aircraft via the IMC such as by a pylori (not illustrated), which extends downwardly from an aircraft wing.

The by-pass structure comprises an inner housing, an outer housing and a plurality of circumferentially spaced vanes arranged between the inner ring and the outer ring, wherein gas flow channels are formed between the adjacent vanes. Embodiments of the vanes will be described hereinbelow.

Figure 2:
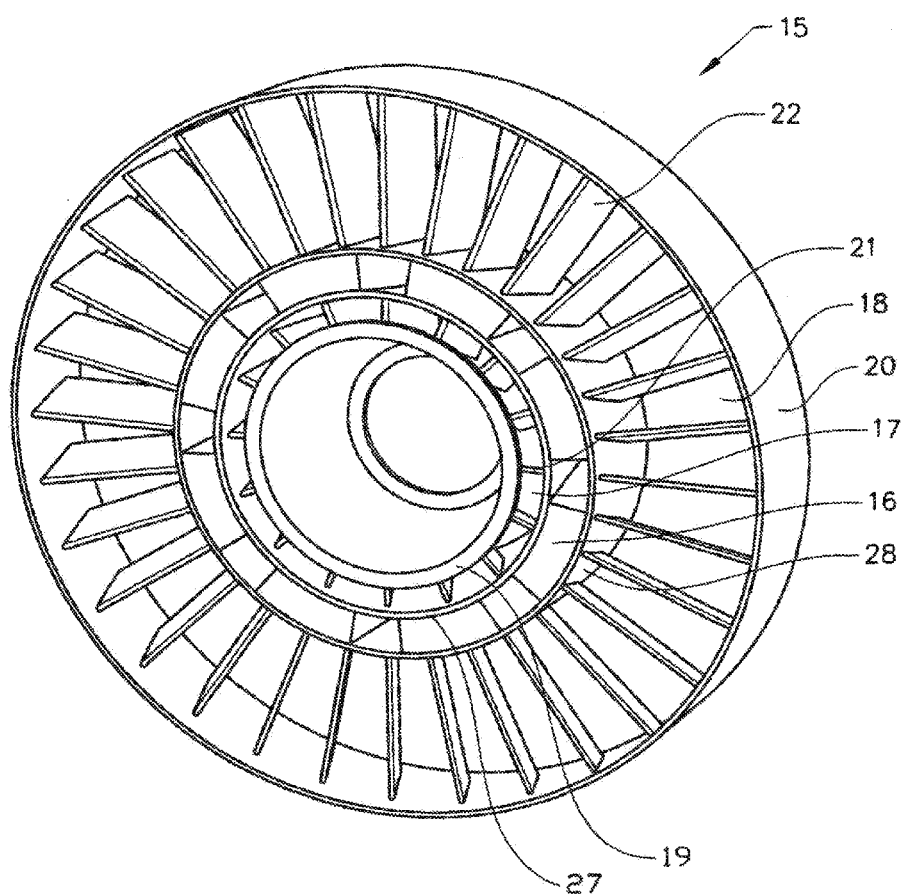
FIG. 2 illustrates a gas turbine structure of the FIG. 1 gas turbine engine.

FIG. 2 illustrates a perspective view of the gas turbine structure 15 which in the FIG. 2 implementation is a static component. The gas turbine structure 15 comprises an annular intermediate member, or splitter, 16, which defines inner and outer annular passages 17, 18. The inner passage 17 forms part of the inner primary gas channel 6 of the aircraft engine and the outer passage 18 forms part of the secondary channel 7 in which the engine bypass air flows.

The annular intermediate member 16 is supported between an inner annular support member 19 and an outer annular support member 20 by a plurality of circumferentially spaced radial inner and outer guide vanes 21, 22. The inner and outer support members 19, 20 and the annular intermediate member 16 are coannular. Opposite ends of the inner guide vanes 21 are rigidly connected to the inner annular member 19 and the intermediate member 16 for transmitting structural loads between the members. Opposite ends of the outer guide vanes 22 are rigidly connected to the intermediate member 16 and the outer annular member 20 for transmitting structural loads between the members.

The air is forced rearwardly through openings between adjacent guide vanes 21, 22. The annular intermediate member 16 comprises an inner ring 27 and an outer ring 28 which may be of metal material. The outer ring 28 together with the outer annular member 20 defines the outer passage 18. The inner ring 27 together with the inner support member 19 defines the inner passage 17. Embodiments of the gas turbine structure 15 will be described hereinbelow.

Figure 3:
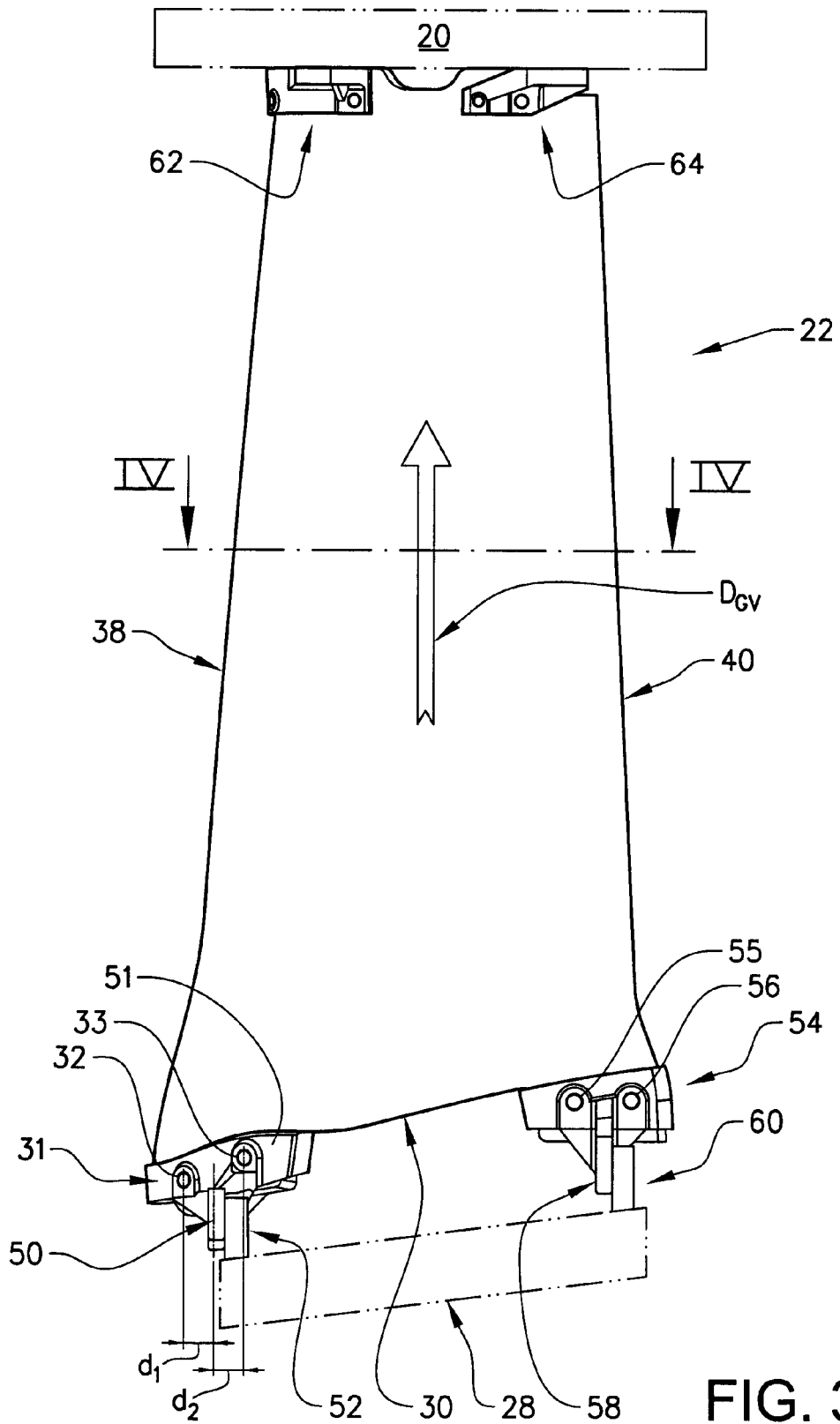
FIG. 3 illustrates a portion of a gas turbine structure according to an embodiment according to the present invention also illustrating a guide vane.

FIG. 3 illustrates an embodiment gas turbine structure 15 to the present invention. As may be gleaned from FIG. 3, the guide vane 22 of the gas turbine structure 5 is attached to a first housing 28, which in the FIG. 3 embodiment is the outer ring, and a second housing 20, which in the FIG. 3 embodiment is the outer annular support member.

However, in other embodiments of the gas turbine structure 15 of the present invention, the first housing 28 and the second housing may be located in other positions in the gas turbine engine 1. Purely by way of example, in embodiments of the gas turbine structure (not illustrated) according to the present invention, the first housing may be the inner annular member 19 and the second housing may be the annular intermediate member 16.

The gas turbine structure 15 of the present invention is preferably located in the cold portions of a gas turbine engine, i.e. in a portion of the engine which is located upstream of the combustor 12 and/or which is located in the fan duct 7.

Moreover, FIG. 3 illustrates that the guide vane 22 extends from the first housing 28 to the second housing 20 in a guide vane direction $D_{Gv}$.

Figure 4:
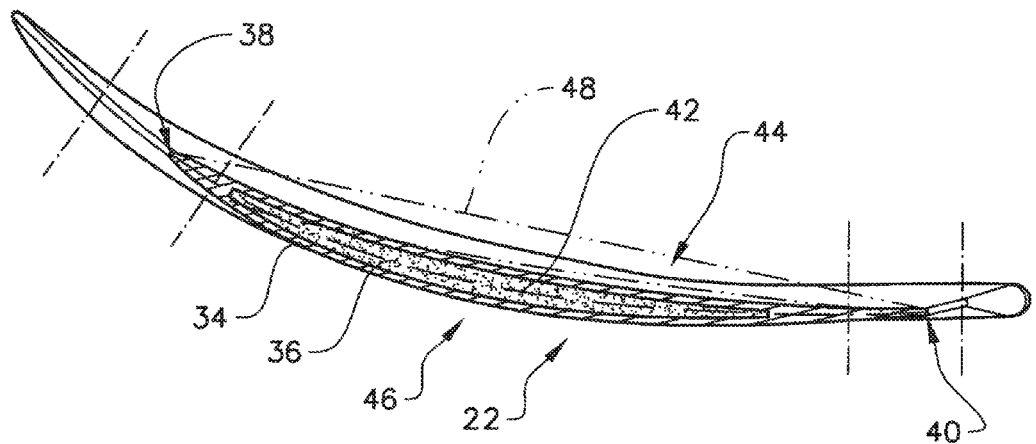
FIG. 4 illustrates a side view of a cross-section of the FIG. 3 guide vane.

The guide vane comprises a leading edge 38 and a trailing edge 40 and the guide vane 22 extends from the leading edge 38 to the trailing edge 40 along a mean camber line 42, see FIG. 4. The mean camber line 42 may extend in a direction which may be perpendicular to the guide vane direction $D_{Gv}$. However, in other implementations of the guide vane 22, the mean camber line 42 may extend in a direction which is perpendicular to the radial direction. A mean camber line 42 which extends in a direction perpendicular to the radial direction may be preferred when determining fastening positions and a stiffening member centre point as will be described hereinbelow.

Moreover, FIG. 3 illustrates that the guide vane 22 comprises a first attachment structure 31, a first fastening means 32 and a second fastening means 33. The first attachment structure 31 is adapted to be releasably attached to the guide vane 22 by the first 32 and second 33 fastening means such that the first fastening means 32 is located at a first fastening position along the mean camber line 42 and the second fastening means 33 is located at a second fastening position along the mean camber line 42.

The first and second fastening means 32, 33 are preferably bolt joints. As such, the guide vane 22 preferably comprises a first opening for receiving a first bolt, which thus may be regarded as constituting the first fastening means 32, and a second opening for receiving a second bolt, which thus may be regarded as constituting the second fastening means 33. However, in other implementations of the first attachment structure 31, at least one of the first and second fastening means 32, 33 may comprise another type of releasable means, such as a rivet, screw or the like. Moreover, in further embodiments of the guide vane 22, at least one of the first and second fastening means 32, 33 may comprise adhesives, a weld joint, a solder joint and/or magnets.

FIG. 3 further illustrates that the first attachment structure 31 comprises a stiffening member 50, or stiffener, extending over at least a portion of a circumference of the first housing 28. Moreover, FIG. 3 illustrates that the first attachment structure 31 comprises a vane attachment portion 51 comprising openings for the first and second fastening means 32, 33. In the implementation of the first attachment structure 31 illustrated in FIG. 3, the first stiffening member 50 is adapted to be attached to a first circumferentially extending flange 52 of the first housing 28. The FIG. 3 embodiment of the gas turbine structure comprises a second attachment structure 54 which is adapted to be attached to the guide vane 22 by a third fastening means 55 and a fourth fastening means 56. The second attachment structure 54 illustrated in FIG. 3 further comprises a second stiffening member 58 which is adapted to be attached to a second circumferentially extending flange 60 of the first housing 28.

Furthermore, FIG. 3 illustrates that the gas turbine structure 15 illustrated therein comprises a third attachment structure 62 and a fourth attachment structure 64 each one of which is attaching the guide vane 22 to the second housing 20.

Each one of the FIG. 3 attachment structures 31, 54, 62, 64 is preferably made of a metal or a metal alloy. Purely by way of example, the metal or metal alloy may comprise at least one of the following metals: aluminium, titanium or steel.

When presenting implementations of the attachment structure hereinbelow, the first attachment structure 31 is used as an example. However, it should be noted that the each one of the below implementations could also, or instead, be implemented on at least one, or all of, the other attachment structures 54, 62, 64.

FIG. 4 illustrates a cross-section of the FIG. 3 embodiment of the guide vane 22 as seen along line IV-IV in FIG. 3. As may be gleaned from FIG. 4, the guide vane 22 is a composite guide vane comprising a cover portion 34 and a core portion 36 which is at least partially enclosed by the cover portion 34. The cover portion 34 comprises a first material and the core portion 36 comprises a second material which is different from the first material.

Purely by way of example, the first material may be a composite material such as a carbon fibre reinforced polymer. Moreover, and again purely by way of example, the second material may be a light weight structural core material such as a foam material or a honeycomb material.

The embodiment of the guide vane 22 illustrated in FIG. 3 and FIG. 4 also comprises a leading edge 38 and a trailing edge 40 and the guide vane 22 extends from the leading edge 38 to the trailing edge 40 along a mean camber line 42. When fluid is forced rearwardly through the gas turbine structure of which the guide vane 22 forms a part, the leading edge 38 is located upstream of the trailing edge 40.

The mean camber line 42 is defined as the locus of points halfway between a pressure side 44 and a suction side 46 of the guide vane 22 as measured perpendicular to the mean camber line 32 itself, see FIG. 4. The camber is identified as the maximum distance between the mean camber line 42 and a cord line 48. The cord line 48 is a straight line extending from the leading edge 38 and a trailing edge 40, wherein the maximum distance is measured in a direction perpendicular to the cord line 48, see FIG. 4. Moreover, the guide vane 22 comprises a chord length being the distance from the leading edge 38 to the trailing edge 40 along the mean camber line 42.

Figure 5:
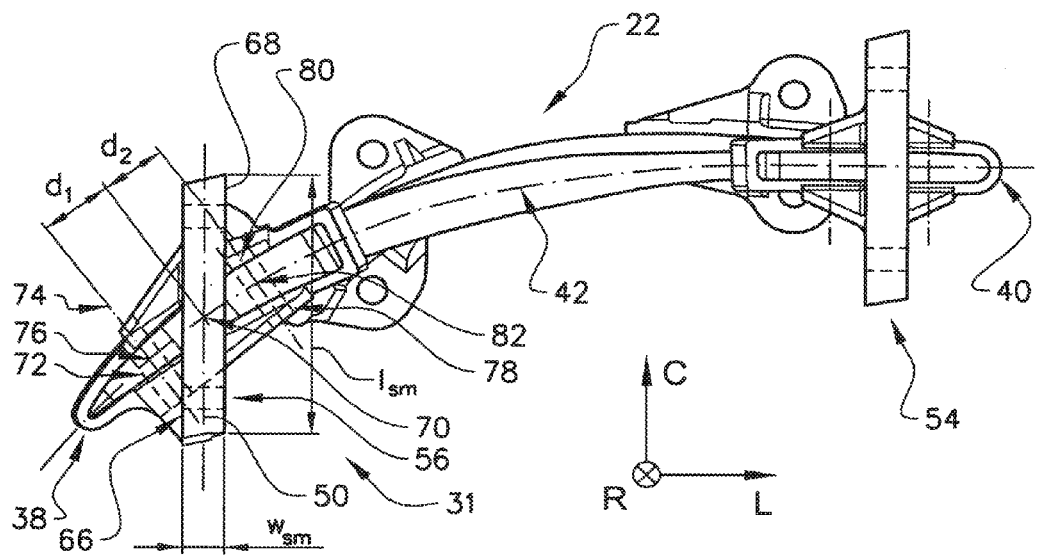
FIG. 5 illustrates a view from below of a portion of FIG. 3 gas turbine structure.

FIG. 5 illustrates a view from the first housing 28 towards the second housing 20 of the guide vane 22, the first attachment structure 31 and the second attachment structure 54. FIG. 5 illustrates that the first attachment structure 31 comprises a stiffening member 50 which in turn comprises a stiffening member width wsm, i.e. an extension in a direction substantially parallel to the longitudinal direction L of the first housing, and a stiffening member length lsm, i.e. an extension in a direction substantially parallel to the circumferential direction C of the first housing. As has previously been indicated, the stiffening member length lsm is preferably at least 3 times, more preferred at least 5 times, greater than the stiffening member width wsm. In the implementation of the stiffening member 50 illustrated in FIG. 5, the stiffening member length lsm is approximately 10 times greater than the stiffening member width wsm.

The stiffening member 50 is preferably made of a metal or a metal alloy. Purely by way of example, the metal or metal alloy may comprise at least one of the following metals: aluminium, titanium or steel.

FIG. 5 further illustrates that the stiffening member 50 comprises a leading surface 66, adapted to face the leading edge 38, and a trailing surface 68, adapted to face the trailing edge 40. Moreover, FIG. 5 illustrates that the stiffening member 50 comprises stiffening member centre point 70 as measured along said mean camber line 42. In other words, the stiffening member centre point 70 is located halfway between the leading surface 66 and the trailing surface 68 in the direction of the mean camber line 42.

FIG. 5 further illustrates that the first attachment structure 31 is attached to the guide vane 22 such that the first and second fastening positions are located on separate sides of the stiffening member centre point 70 along the mean camber line 42.

Generally, each one of the first fastening means and the second fastening means has an extension in a direction perpendicular to the mean camber line 42 and the fastening means has a fastening means centre line in the direction perpendicular to the mean camber line 42. The fastening position is determined as the position where the fastening means centre line, or an extension thereof, intersects the mean camber line 42.

Moreover, FIG. 5 illustrates that the guide vane 22 comprises a first opening 72 for receiving the first fastening means (not shown in FIG. 5). The first opening 72 comprises a first opening centre line 74. As such, in implementations of the guide vane 22 which comprises a first opening 72 for the first attachment means, the position wherein the first opening centre line 74 intersects the mean camber line 42 is herein used as the first fastening position 76.

In a similar vein, the guide vane 22 comprises a second opening 78 for receiving the first fastening means (not shown in FIG. 5). The second opening 78 comprises a second opening centre line 80. As such, in implementations of the guide vane 22 which comprises a second opening 78 for the second attachment means, the position wherein the second opening centre line 80 intersects the mean camber line 42 is herein used as the second fastening position 82.

FIG. 5 further illustrates that, when measured along the mean camber line 42, the first fastening position 76 is located at a first distance d1 from the stiffening member centre point 70 and the second fastening position 82 is located at a second distance d2 from the stiffening member centre point 70. The larger of the first and second distances d1, d2 is less than 2 times, preferably less than 1.5 times, the smaller of the first and second distances di d2.

Preferably, the first and second distances d1, d2 are substantially equal resulting in that the first and second fastening positions are located symmetrically around the stiffening member 50 such that an appropriate load distribution is obtained in the attachment members between the guide vane 22 and the first housing 28.

At least one of the first opening 72 and the second opening 78 preferably extends through a portion of the guide vane which comprises the cover portion 34 but not the core portion 36. In other words, the core portion 36 of the guide vane 22 preferably terminates before at least one, but preferably both, of the first opening and second opening 72, 78 in order to obtain an appropriate strength of the attachment between the guide vane 22 and the first attachment structure 31.

Figure 6:
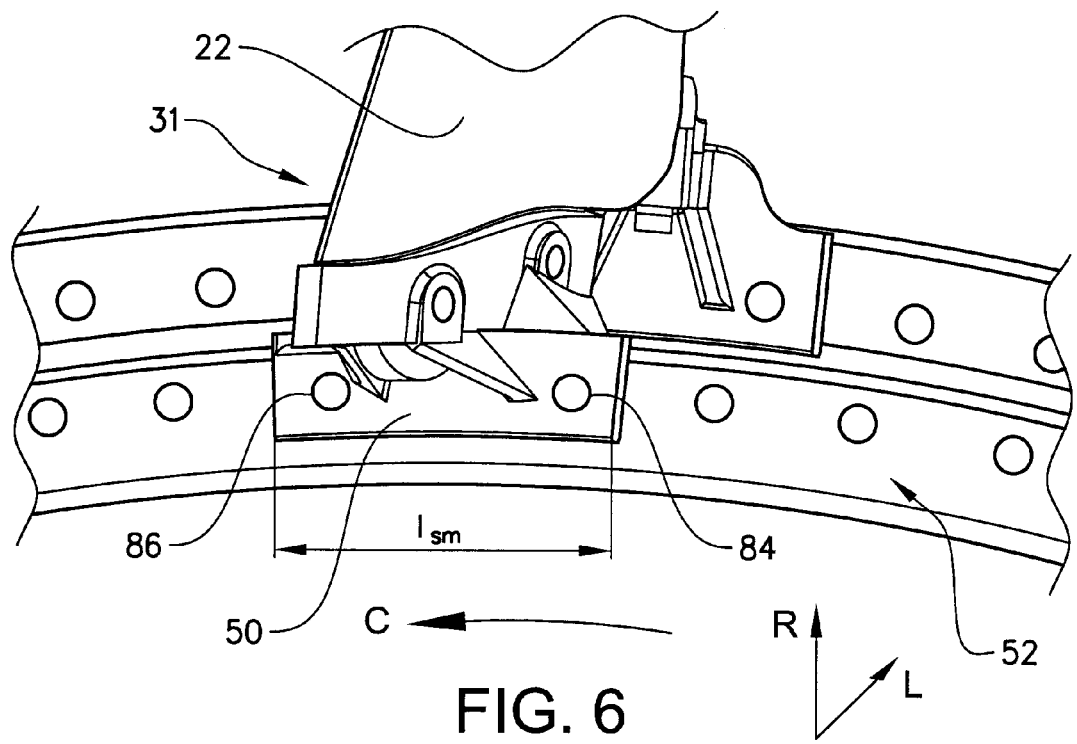
FIG. 6 illustrates a perspective view of a portion of FIG. 3 gas turbine structure.

In an embodiment of the gas turbine structure wherein the stiffening member 50 attached to the flange 52 of the first housing 28, such as in the example illustrated in FIG. 3, the first attachment structure 31 is preferably adapted to be attached to the flange 52 by means of at least a fifth fastening means, such as a bolt joint, with the fifth fastening means, for instance a bolt or several bolts, extending in a third fastening direction which forms an angle with the vane direction DGv- To this end, reference is made to FIG. 6 which illustrates a portion of the FIG. 3 embodiment of a gas turbine structure. As may be gleaned from FIG. 6, the first attachment structure 31 is adapted to be attached to the flange 52 by the fifth fastening means comprising releasable fastening members which in FIG. 6 is exemplified as two bolts 84, 86. However, other implementations of the fifth fastening means may comprise other types of releasable fastening means, such as rivets or the like. The two bolts are preferably located at a distance from one another in the circumferential direction C and the bolts are preferably adapted to extend through openings in the stiffening member 50.

Moreover, the openings for the two bolts 84, 86 in the stiffening member 50 are preferably located at a distance from one another in the circumferential direction C which is equal to or greater than 50% of the stiffening member length lsm such that the assembly of the flange 52 and the stiffening member 50 may provide a sufficient attachment stiffness, at least in the radial direction R, for the guide vane 22.

Preferably, the third attachment direction is substantially parallel to the longitudinal direction L of the first housing, see FIG. 6.

Figure 7:
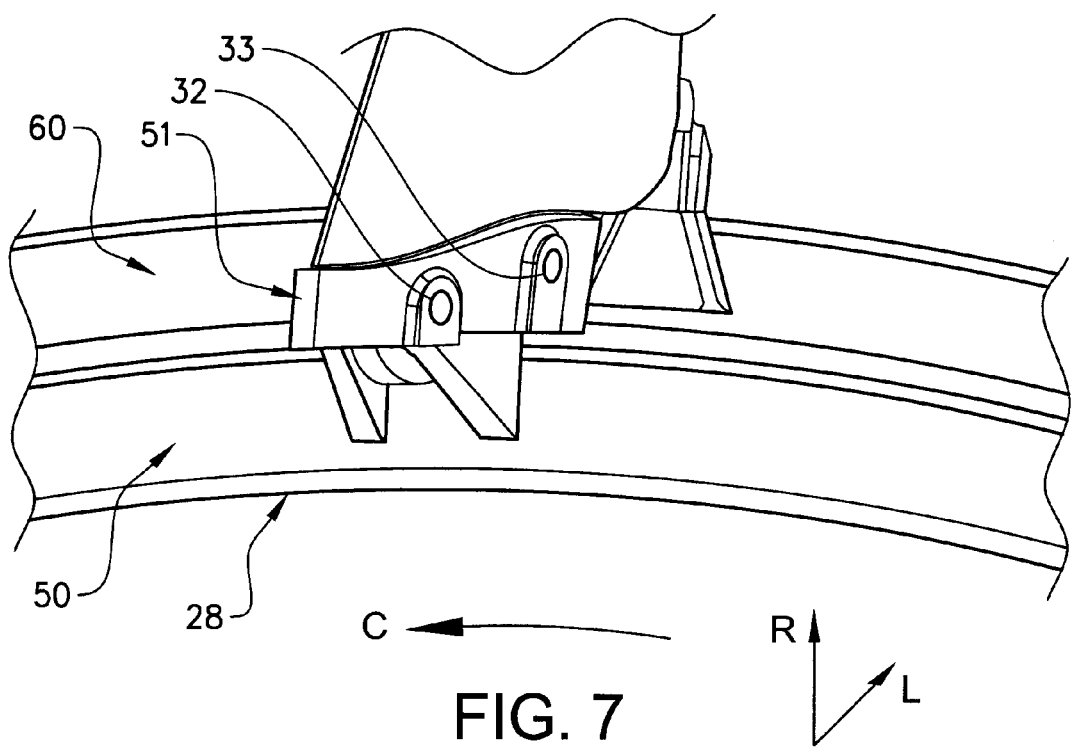
FIG. 7 illustrates a perspective view of a portion of another embodiment of a gas turbine structure of the present invention.

Instead of providing a first attachment structure 31 which is releasably attached to the first housing 28, the first attachment structure 31 may be fixedly attached to the first housing 28. To this end, reference is made to FIG. 7 illustrating and embodiment of the gas turbine structure wherein the first attachment structure 31 comprises a vane attachment portion 51 comprising the openings for the first and second fastening means 32, 33. The vane attachment portion 51 is fixedly attached to the stiffening member 50, which in the FIG. 7 embodiment, comprises a circumferentially extending flange which in turn is fixedly attached to the first housing 28. In other implementations of the first attachment structure 31, the stiffening member 50 may comprise a ring (not shown) which is fixedly attached to the first housing 28.

Figure 8:
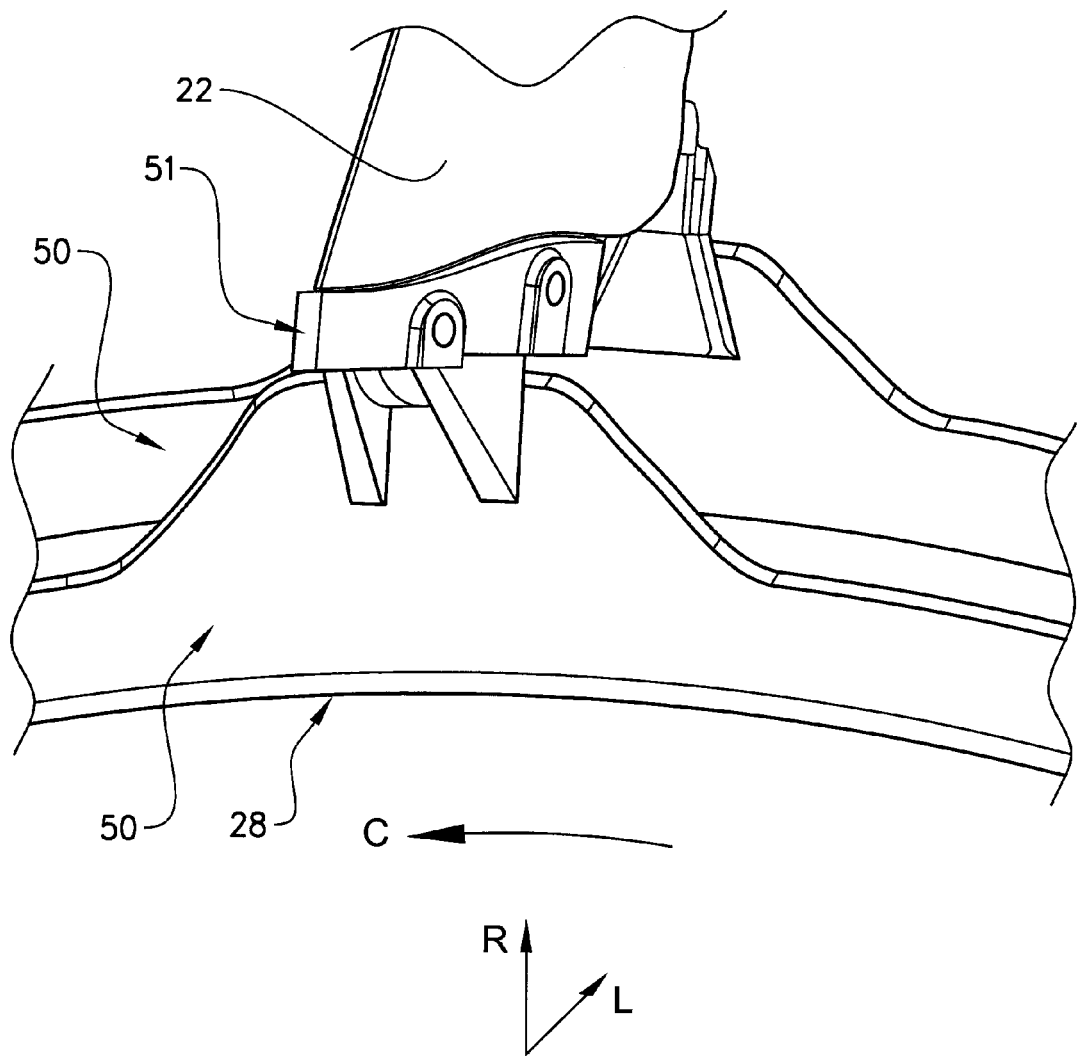
FIG. 8 illustrates a perspective view of a portion of a further embodiment of a gas turbine structure of the present invention.

It should be noted that the flange or ring as discussed hereinabove with reference to FIG. 7 need not have a constant height, i.e. extension in the radial direction R. Instead, in implementations of the stiffening member 50, the flange or ring may have a height which is relatively large at the vane attachment portion 51 and which height decreases, continuously or in a step-wise manner, at a distance in the circumferential direction C from the vane attachment portion 51, see FIG. 8.

It is to be understood that the present invention is not limited to the embodiments described above and illustrated in the drawings; rather, the skilled person will recognize that many changes and modifications may be made within the scope of the appended claims.

The invention claimed is:

1. A gas turbine structure comprising a guide vane, the gas turbine structure further comprising a first housing and a second housing and the guide vane extending from the first housing to the second housing, the guide vane comprising a leading edged and a trailing edge, the guide vane extending from the leading edge to the trailing edge along a mean camber line, the guide vane comprising a first attachment structure, a first fastening means and a second fastening means, the first attachment structure comprising a stiffening member extending over at least a portion of a circumference of the first housing, the stiffening member comprising a stiffening member centre point as measured along the mean camber line, the first attachment structure being adapted to be releasably attached to the guide vane by the first and second fastening means such that the first fastening means is located at a first fastening position along the mean camber line and the second fastening means is located at a second fastening position along the mean camber line, the attachment structure being attached to the first housing the first and second fastening positions are located on separate sides of the stiffening member centre point along the mean camber line.

2. The gas turbine structure according to claim 1, wherein, when measured along the mean camber line, the first fastening position is located at a first distance from the stiffening member centre point and the second fastening position is located at a second distance from the stiffening member centre point, the larger of the first and second distances being less than 2 times the smaller of the first and second distances.

3. The gas turbine structure according to claim 1, wherein the attachment structure is attached to a flange of the first housing.

4. The gas turbine structure according to claim 3, wherein the first attachment structure is adapted to be attached to the flange by means of at least a third fastening means, the guide vane extending in a guide vane direction from the first housing to the second housing and the third fastening means extending in a third fastening direction which forms an angle with the guide vane direction.

5. The gas turbine structure according to claim 4, wherein the first housing extends in a longitudinal direction parallel to a longitudinal axis, the first housing further extending, in a circumferential direction around the longitudinal axis, the third attachment direction being substantially parallel to the longitudinal direction.

6. The gas turbine structure according to claim 1, wherein the first attachment structure is fixedly attached to the first housing.

7. A gas turbine engine comprising a gas turbine structure according to any one of the preceding claims.

8. An aeroplane comprising a gas turbine engine according to claim 7.

9. A gas turbine structure comprising a guide vane, the gas turbine structure further comprising a first housing and a second housing and the guide vane extending from the first housing to the second housing, the guide vane comprising a leading edge and a trailing edge, the guide vane extending from the leading edge to the trailing edge along a mean camber line, the guide vane comprising a first attachment structure, a first fastener and a second fastener, the first attachment structure comprising a stiffener extending over at least a portion of a circumference of the first housing, the stiffener comprising a stiffener centre point as measured along the mean camber line, the first attachment structure being adapted to be releasably attached to the guide vane by the first and second fastener such that the first fastener is located at a first fastening position along the mean camber line and the second fastener is located at second fastening position along the mean camber line, the attachment structure being attached to the first housing wherein the first and second fastening positions are located on separate sides of the stiffener centre point along the mean camber line.

10. The gas turbine structure according to claim 9, wherein, when measured along the mean camber line, the first fastening position is located at a first distance from the stiffener centre point and the second fastening position is located at a second distance from the stiffener centre point, the larger of the first and second distances being less than 2 times the smaller of the first and second distances.

11. The as turbine structure according to claim 9, wherein the attachment structure is attached to a flange of the first housing.

12. The gas turbine structure according to claim 11, wherein the first attachment structure is adapted to be attached to the flange by means of at least a third fastening means, the guide vane extending in a guide vane direction from the first housing to the second housing and the third fastening means extending in a third fastening direction which forms an angle with the guide vane direction.

13. The gas turbine structure according to claim 12, wherein the first housing extends in a longitudinal direction parallel to a longitudinal axis, the first housing further extending in a circumferential direction around the longitudinal axis, the third fastening direction being substantially parallel to the longitudinal direction.

14. The gas turbine structure according to claim 9, wherein the first attachment structure is fixedly attached to the first housing.

15. A gas turbine engine comprising a gas turbine structure according to claim 9.

16. An aeroplane comprising a as turbine engine according to claim 15.

\* \* \* \* \*

UNITED STATES PATENT AND TRADEMARK OFFICE
CERTIFICATE OF CORRECTION

| | |
|---|---|
| PATENT NO. | : 9,435,215 B2 |
| APPLICATION NO. | : 14/005146 |
| DATED | : September 6, 2016 |
| INVENTOR(S) | : Niklas Jansson et al. |

It is certified that error appears in the above-identified patent and that said Letters Patent is hereby corrected as shown below:

In the claims:

Column 10, in line 22, replace "The as turbine" with -- The gas turbine --.

Column 10, in line 44, replace "comprising a as turbine" with -- comprising a gas turbine --.

Signed and Sealed this
First Day of November, 2016

Michelle K. Lee
*Director of the United States Patent and Trademark Office*